O. G. SCHUTZE.
CONSTRUCTION OF OPHTHALMIC MOUNTINGS.
APPLICATION FILED APR. 8, 1919.

1,343,090.

Patented June 8, 1920.

INVENTOR
OSCAR GEORGE SCHUTZE
BY Munn+Co
ATTORNEYS

UNITED STATES PATENT OFFICE.

OSCAR GEORGE SCHUTZE, OF FORESTVILLE, NEAR ADELAIDE, SOUTH AUSTRALIA, AUSTRALIA.

CONSTRUCTION OF OPHTHALMIC MOUNTINGS.

1,343,090.  Specification of Letters Patent.  Patented June 8, 1920.

Application filed April 8, 1919. Serial No. 288,597.

*To all whom it may concern:*

Be it known that I, OSCAR GEORGE SCHUTZE, a subject of the King of Great Britain and Ireland, residing at 73 Victoria street, Forestville, near Adelaide, State of South Australia, Commonwealth of Australia, have invented certain new and useful Improvements in and Relating to the Construction of Ophthalmic Mountings, of which the following is a specification.

This invention relates to certain improvements in and relating to the construction of ophthalmic mountings and in particular, rimless spectacles mountings or bridges; rimless pince-nez clips or mountings and pince-nez frames or mountings.

Its objects are to enable the lenses, when secured to their straps or rims to be adjusted as either "central", "inset" or "offset", and either in "level" or in "lowered" position (this latter applies only to those mountings in which the lenses are secured in the straps by screws). The invention also simplifies the assembling of individual members of the mounting in the case of pince-nez. Incidentally it facilitates the adjusting and straightening of pince-nez and rimless spectacles.

In order that my invention may be clearly understood I will describe the same with reference to the accompanying drawings in which:—

Figure 1:
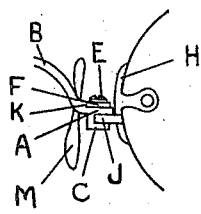
Figure 1 is a front view of one-half of the rimless spectacle mounting constructed according to my invention.

I will first describe my invention as applied to a rimless spectacle mounting, that being the simplest application.

As usually constructed such a mounting comprises a curved bar or bridge having upon each end a strap or lens retaining rim to which the two lenses are immediately secured and a pad arm carrying a pad which rests upon the nose of the wearer. The straps or lens mountings are soldered or otherwise rigidly secured to the ends of the curved bar or are formed integral therewith and are comprised of U shaped members having shoulders extending from the troughs of such U shaped members in such a manner as to coincide with the edges of the lenses when fitted thereto, said lenses being placed between the extending arms of the U shaped members and secured there by means of cement, screws, pins or other device. The pad arms are attached to the curved bar or bridge by means of screws passing through eyes in the ends of the arms and into screw-threaded sockets in horizontal platforms between the ends of the curved bar and the lens retaining straps.

According to my invention, instead of the aforesaid straps which carry the lenses being rigidly secured to or integral with the curved bar forming the crest of the bridge they are adjustably attached thereto as follows:—

The horizontal platform A at each end of the curved bar B is formed with an open box C on its under surface, the openings being at the front and back of the bridge, and through the center of the platform is a screw-threaded hole D to take a clamping screw E which first passes through the eye in the pad arms F and then into the platform forming the top of said box.

Instead of the strap H being soldered to or formed integral with the curved bar B, the strap has soldered or otherwise rigidly secured to it or formed integral with it a small square adjusting bar J extending a short length in the direction opposite to that of the arms of the strap and being then bent at right angles to the arms, that is to the surface of the lens when fitted. The straps H are as usual made in pairs and the bar J is set either above or below the center of the lens and on either side, but said straps must be made for their respective sides i. e., right or left side of mounting or bridge. The adjusting bars J are made a slidable fit in the boxes C below the platforms A.

At the commencement of the platform, that is where the curved bar runs into the platform, there is formed a vertical edge or wall K rising from the flat platform and being either curved or straight but so shaped that the pad arm F, which is correspondingly shaped, when engaged by the clamping screw E is locked in position.

The pads M, which rest upon the nose of wearer, are attached to the said platforms by pad arms F having the ends, which rest upon the platforms, of a shape to coincide with or engage the vertical surfaces K rising from the flat platforms, and having holes therein to allow the screws E to pass through into the threaded holes of the platforms.

The square adjusting bars J projecting from the straps H are inserted in the boxes and are clamped or secured therein by screwing down the screws E passing through the pad arms and into the screw-threaded holes of platforms.

If the adjusting bar J on a strap is situated below the center of same, then by inserting the bar as far as possible in the box C from the front of mounting or bridge as indicated by full lines in Fig. 4 the center of the strap will coincide with the center of the flat platform in both the vertical and horizontal meridians or planes. For convenience this position of the strap and consequently of the lens when fitted will be termed "central and level".

Figure 4:
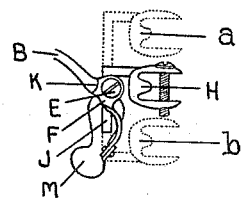
Fig. 4 is a plan view of the mounting shown in Fig. 1 the dotted lines indicating extreme alternative positions of the lens retaining strap.
Figure 2:
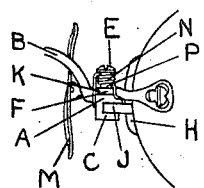
Fig. 2 is a similar view of one half of a rimless pince-nez mounting.
Figure 5:
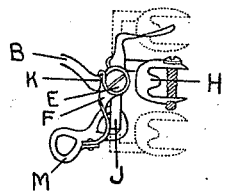
Fig. 5 is a plan view of the mounting shown in Fig. 2 the dotted lines indicating extreme alternative positions of the lens retaining strap.
Figure 3:
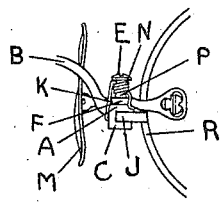
Fig. 3 is a similar view of one half of a pince-nez frame or clip.
Figure 6:
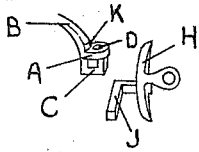
Fig. 6 is a detail view showing (*a*) the lens retaining strap with the projecting adjusting bar and (*b*) the end of the curved bar or bridge with the open box into which said strap fits.
Figure 7:
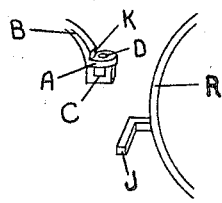
Fig. 7 is a similar view to Fig. 6 but showing portion of a lens retaining rim instead of a lens retaining strap.
Figure 8:
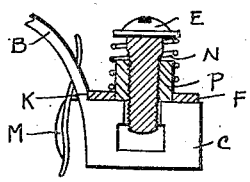
Fig. 8 is a front view partly in section and on an enlarged scale of the mounting shown in Figs. 2 and 3 and with the lens and its strap omitted.

If the bar J is now partly withdrawn from the box C the relative positions between the platform and strap will be the same in the horizontal meridian or plane, but will be displaced outward in the vertical plane as indicated by the dotted lines $a$ in Fig. 4. This position will be termed "offset and level."

If the bar J is now withdrawn altogether from the box C and inserted from the opposite side (i. e. the back of mounting or bridge) as far as possible the center of the strap will now be central with the vertical meridian of platform but lower than the horizontal, therefore this position will be "central and lowered."

On partly withdrawing the bar J again the strap will be displaced inward from the vertical meridian or plane, which will give the same strap the position of "inset and lowered."

If on the other hand the strap is required to be "inset" but not "lowered" the other strap of the pair is inserted in the said box from the back of the mounting or bridge as indicated by dotted lines $b$ in Fig. 4. This will give the strap the position of "inset and level."

The last position possible, that is "offset and lowered" is achieved by withdrawing the strap from the box from immediately previous position (i. e. "inset and level") and inserting it in the box from the opposite direction, that is from the front of mounting.

Thus, by simple and speedy adjusting, reversing, interchanging, or interchanging and reversing of the straps, six distinctly different positions of same and consequently of the lenses are obtainable. Also the amount of "inset" or "offset" may be adjusted as required.

In the case of the rimless pince-nez clip the construction and application of the straps and the adjusting bars are the same as for the rimless spectacle mounting or bridge as described, but the following modifications to the mounting are required for the attachment and fitting of the nose-gripping pands M and springs N. The pad arms F must be movable to allow the pad to grip the nose and they must be fitted with springs to hold the mounting in place upon the wearer's nose.

A circular hollow post P is set up above the screw-threaded hole in the center of each of the flat platforms having on its internal surface a screwthread commencing slightly below its top and passing through the platform. The screw passes through the post P and through the platform A and impinges upon the square bar or shaft J of the lens strap in the box below the platform.

A pad arm F and spring N fits over the post P and is retained by the head of beforementioned screw E. The pad arm F is a lever-like member having a perforation at about the center enabling it to fit over the post and upon the platform, the projection on one side (that to the front) forming the finger piece or grip, and that on the opposite side (that to the rear) carrying the pad M which engages the nose of wearer. The coil spring N also is placed over the post resting upon the pad arm, one end engaging the pad arm, and the other impinging against the bridge adjacent to the platform or against the platform so as to tend to draw the pad inward, both ends being on the front of the mounting.

When the finger pieces or grips of the pad arm are drawn together the posts P act as fulcrums, whereby the opposite ends of pad arms are both turned outward. This causes tension on the springs N which therefore brings the arms back into position immediately the pressure is removed from the finger pieces or grips of same.

In the case of the pince-nez frame or mounting in which the lenses are held in encircling rims or eyewires R instead of the straps previously described the beforementioned small square adjusting bars J are set upon the rims or eyewires R wherein the lenses are secured, (said bars being set immediately either above or below the horizontal center of the lens when fitted and on either side of said rims) but the bars J must be set in positions such that, when they are inserted in the boxes C beneath the platforms from one side of the mounting or bridge, the positions of the rims or eyewires will correspond. That is:—if the bars J, after being connected to rims or eyewires R, are inserted as far as possible in the boxes C from the front of clip or mounting both rims or eyewires will be "central and level" or "central and lowered" according to the positions in which both bars have been set. The construction and attachment of the pad arm F and spring N will be the same as described for the rimless pince-nez mounting or clip.

What I claim is:—

1. In an ophthalmic mounting, a bridge, a box upon the end of the bridge having openings at the front and back, a lens mounting provided with a bar rigid therewith and extending into the box, and a set screw clamping the bar in the box in the desired position.

2. An ophthalmic mounting, comprising a bridge having a box open at the front and back, a lens retaining member having an angular adjusting bar rigid therewith and projecting from it at right angles to the surface of the lens, a clamping device whereby the adjusting bar is secured in the desired position in the box.

3. An ophthalmic mounting, comprising a bridge having a platform, and a box on the underside of the platform, said box being open at the front and back, a lens retaining member, an angular adjusting bar of square section rigid with the members and projecting from it at right angles to the surface of the lens, said bar adjustably fitting in the said box, and a clamping screw whereby the adjusting bar is secured in the desired position in the box.

4. An ophthalmic mounting comprising a bridge having a platform provided with a box and with a vertical edge or wall rising from the upper face of the platform, said platform having a screw threaded opening, a lens mounting having an arm fitting in the box, a pad having an apertured arm fitting on the platform, and a clamping screw passing through the aperture in the pad arm and the screw threaded hole in the platform and into engagement with the adjusting bar of the lens mounting.

5. In an ophthalmic mounting, a bridge provided with a circular platform having a threaded opening, a lens mounting having an arm engaging the platform, a circular post set above the threaded opening in the center of the circular platform, said post being hollow and screw threaded, a pad having an arm fitting upon the post, a coil spring having one end engaging the pad arm and the other end impinging against the platform, and a clamping screw carried by the screw-threaded circular post and engaging the bar of the lens retaining strap or rim to secure it to the platform.

6. In an ophthalmic mounting, a curved bar or bridge having at each end a box open at the front and back and with a screw threaded hole through the top of the box, in combination with two lens mountings, each having a bar projecting at right angles to the surface of the lens, and clamping devices whereby the bars are held in the desired position.

7. In an ophthalmic mounting, a bridge having a box, a lens mounting having a bar rigid with said mounting and projecting therefrom at right angles to the surface of the lens, said bar fitting into the said box, and a clamping device whereby the bar may be adjusted in position.

8. In an ophthalmic mounting, a lens mounting having an adjusting bar projecting from it at right angles to the surface of the lens, in combination with a curved bar or bridge having a platform and a box formed on the underside of the platform and open at the front and rear, said platform having a screw threaded opening at its center, and a clamping screw engaging the screw threaded opening of the platform and impinging upon the top of the adjusting bar, whereby the bar is held in the desired position in the box.

9. In an ophthalmic mounting, in combination with a bridge having platforms, lens mountings each having an arm engaging the platform, a circular hollow post with internal screw thread set in the center of each platform, a pad having an arm provided with a perforation at about the center of the arm fitting over the post and upon the platform, a coil spring placed over each post and resting upon a pad arm, one end engaging the projecting portion of the pad arm and the other end engaging the platform, and screws passing through the posts and platforms and engaging the arms of the lens mountings.

In testimony that I claim the foregoing as my invention I have signed my name in the presence of two subscribing witnesses this 21st day of February, 1919.

OSCAR GEORGE SCHUTZE.

Witnesses:
ARTHUR GORE COLLISON,
FLORENCE MANTHORPE.